United States Patent [19]

Bowling

[11] Patent Number: 4,906,146

[45] Date of Patent: Mar. 6, 1990

[54] AXIALLY SELF-ALIGNING DRILL BIT

[76] Inventor: Roy E. Bowling, 815 Benton St., Lakewood, Colo. 80215

[21] Appl. No.: 619,690

[22] Filed: Jun. 13, 1984

Related U.S. Application Data

[63] Continuation of Ser. No. 292,666, Aug. 13, 1981, abandoned.

[51] Int. Cl.⁴ .................. B23B 51/00; B27G 15/00
[52] U.S. Cl. ........................... 408/227; 408/226; 408/228
[58] Field of Search ............... 408/199, 226, 227, 228; 145/116 R, 116 A, 124, 130; 175/327

[56] References Cited

U.S. PATENT DOCUMENTS

| 385,088 | 6/1888 | Beneie | 408/227 |
|---|---|---|---|
| 2,681,673 | 6/1954 | Mackey | 145/116 R |
| 2,782,824 | 2/1957 | Robinson | 408/226 X |
| 2,794,468 | 6/1957 | Huxtable | 408/227 X |
| 2,889,725 | 6/1959 | Turton et al. | 408/228 |
| 2,977,828 | 4/1961 | Strickland | 408/228 |
| 3,116,654 | 1/1964 | Nider | 408/228 |
| 3,121,351 | 2/1964 | Mount | 408/228 |
| 3,263,958 | 8/1966 | Cox et al. | 408/226 X |
| 3,697,188 | 10/1972 | Pope | 408/226 |
| 3,865,502 | 2/1975 | Hamann | 408/226 |
| 4,076,444 | 2/1978 | Siebrecht | 408/226 |
| 4,093,395 | 6/1978 | Luebbert | 408/199 X |
| 4,157,714 | 6/1979 | Foltz et al. | 408/228 |

FOREIGN PATENT DOCUMENTS

| 588654 | 5/1925 | France | 175/327 |
|---|---|---|---|
| 0012305 | of 1892 | United Kingdom | 408/199 |

*Primary Examiner*—Robert L. Spruill

[57] ABSTRACT

A drill bit having an elongated, stiffly flexible shank and integral, hardened, enlarged cutting head and tip is adapted to maintain a penetration angle through a plurality of spaced wooden objects while being rotatably driven by a drill. The tip of the drill bit forms a portion of a cutting head and is of generally triangular shape having two relatively enlarged opposed flat surfaces joined by two tapered surfaces. The tapered surfaces intersect at a tip edge defined by a line which makes an acute angle with a plane bisecting said drill bit along the longitudinal axis thereof, and which plane is perpendicular to the flat surfaces.

1 Claim, 1 Drawing Sheet

U.S. Patent     Mar. 6, 1990     4,906,146
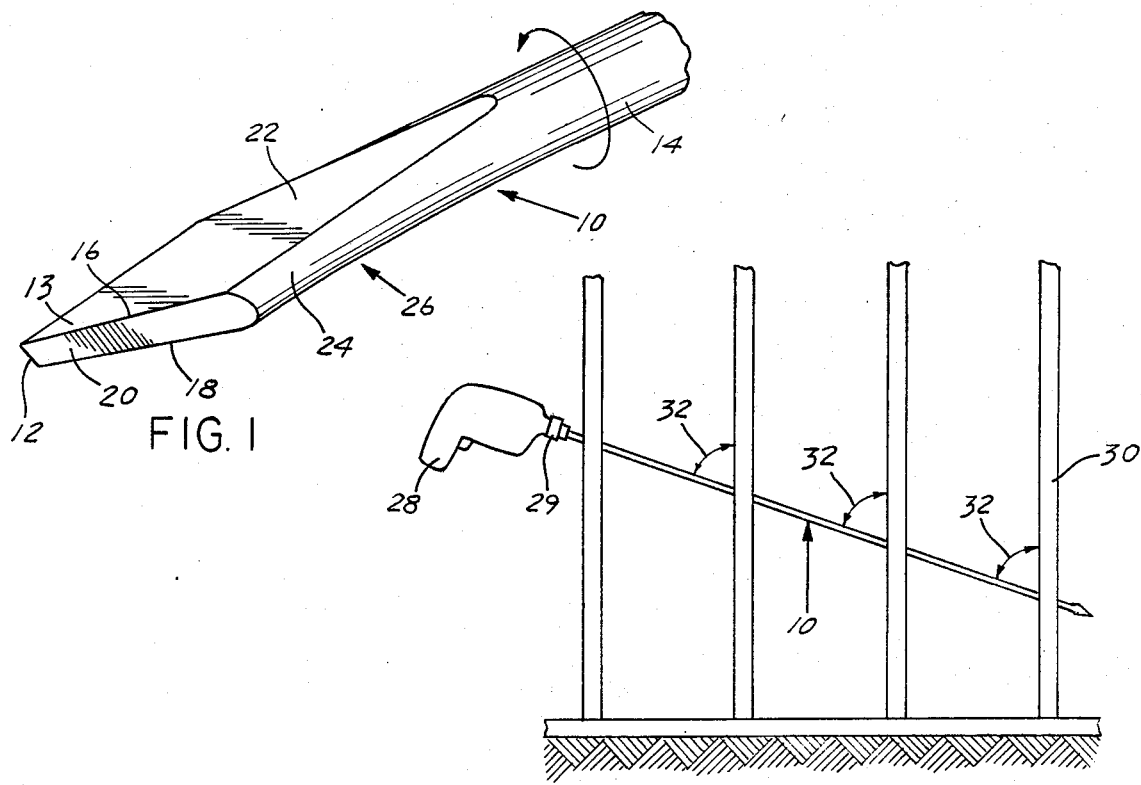
FIG. 1
FIG. 2
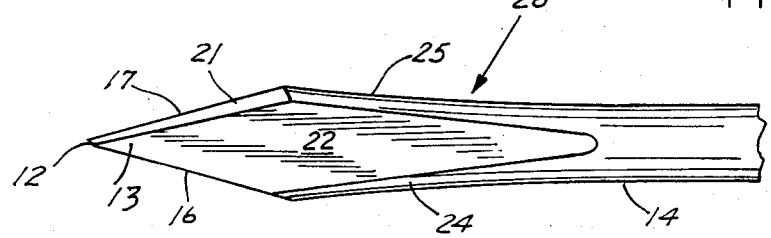
FIG. 3
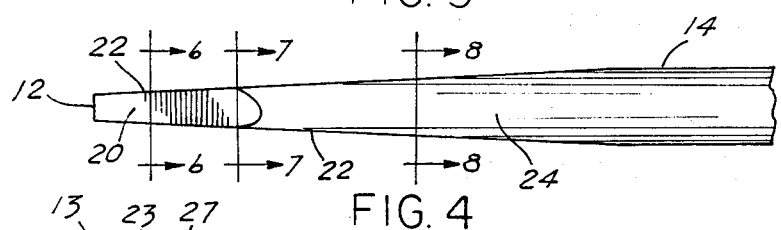
FIG. 4
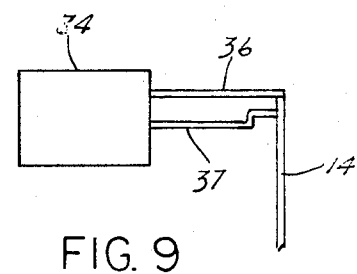
FIG. 9
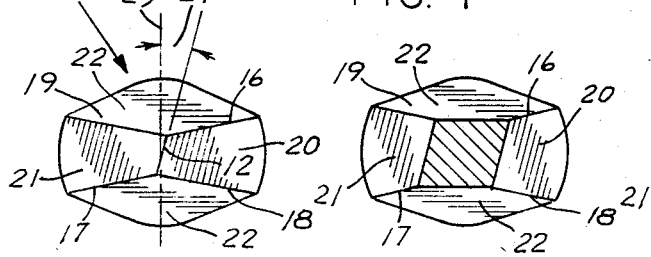
FIG. 5    FIG. 6    FIG. 7    FIG. 8

AXIALLY SELF-ALIGNING DRILL BIT

CROSS REFERENCE TO RELATED APPLICATION

This is a continuation of application Ser. No. 292,666, filed Aug. 13, 1981, now abandoned.

BACKGROUND OF THE INVENTION

1. Field of the Invention

The present invention relates to cutting by use of a rotating axially-moving drill bit, and more particularly drill bits of the type having a central lead screw and integral elongated shank.

2. Brief Description of the Prior Art

Drill bits adapted to drill through wood over extended distances by use of integral elongated shanks are known. Specifically, a conventional drill bit including a spiral channel and radial cutting edge has been integrally connected to an elongated shank. Problems have developed in attempting to pass a drill bit through relatively large distances, up to six feet, by use of the drill bits known in the prior art. When drilling at a steep angle through a plurality of wall studs, for example, such a drill bit has a tendency to "walk", that is, trail off of the ideal path of travel, which would be a line extending axially forward from a longitudinal axis of the drill bit. This may be in part due to the asymmetric nature of the initial cutting edge of the prior art drill bits.

An elongated shank integrally connected to cutting head formed of three intersecting, equilateral triangles is seen in U.S. Pat. No. 3,121,351 to G. W. Mount. The three triangular planar end faces have a common intersecting point on the longitudinal axis of the shank. Three separate cutting edges, each formed by the line of intersection of two triangular surfaces, when cutting a wood surface, do not introduce any asymmetric forces into the drilling operation. However, this construction does not have the ability to traverse spaces between studs while maintaining the straight line axial movement desired. Furthermore, because the cutting head substantially fills the bore made by the drill, this construction results in decreased drilling efficiencies due to an inability to move wood shavings out of the way of the rotating cutting head.

A relatively flat cutting head assists in keeping wood shavings from interfering with the drilling operation, while a drill tip ending in a point allows a user of a drill bit to stick the drill bit into a piece of wood and self-start a hole. Both of these features are seen in U.S. Pat. No. 2,794,468 to Huxtable and U.S. Pat. No. 2,782,824 to Robinson, which show the use of a flat triangular point as a hole starter. Neither of these patents suggest the benefits of using a flat cutting tool with a triangular point in boring relatively long distances. The configurations of the drill bits shown in these patents induce a laterally extending cutting edge which makes at least a ninety degree angle with the longitudinal axis of the drill bit. Using the drill bit structure of either patent to cut through a remotely placed wall stud would result in asymmetric forces being applied to the rotating drill bit and would result in "walking" of the drill bit.

OBJECTS AND SUMMARY OF THE INVENTION

The principal object of the present invention is to provide an improved drill bit for remotely drilling holes through a plurality of spaced objects while maintaining the holes in axial alignment with the longitudinal axis of the drill bit.

A related object of the present invention is to provide a drill bit of the foregoing character for drilling axially aligned holes faster and with less physical effort on the part of the operator of the drill.

A further related object of the present invention is to provide a drill bit that will not be bound by wood shavings formed as the holes are drilled.

Another object of the present invention is to provide an extremely hard drill bit that is easily resharpened for continued use.

A related object of the present invention is to provide a method for producing a drill bit of the foregoing type that is hard and easily sharpened.

Still a further object of the present invention is to provide a drill bit that has a directional control.

In accordance with the foregoing objects, the present invention is embodied in an axially self-aligning drill bit having an elongated cylindrical shank integrally connected to a cutting head. The shank is adapted to be releasably connected to a power or hand drill.

The cutting head is formed by two opposed enlarged triangular, diamond or parallelogram-shaped flat surfaces which extend and slope from the shank to a tip edge. The two enlarged surfaces are offset slightly with respect to each other to form a linear tip, which interconnects the apex points of the spaced parallelogram-shaped or diamond-shaped surfaces. The tip edge is skewed with respect to a plane perpendicular to the enlarged surfaces and bisects the drill bit along a longitudinal axis.

The cutting point of the bit head is of generally triangular shape and includes approximately half of the forwardmost area of each of the relatively enlarged flat surfaces. A pair of sloping surfaces are ground so as to intersect at the tip and define the cutting edges of the bit.

The present invention is further embodied in a process for forming the drill bit. The end of the shank from which the cutting head is to be formed is electrically heated to cherry red, mechanically worked to flatten and enlarge the surfaces, cut to shape and rapidly quenched. The tapered surfaces are then ground to a specific angle to form the tip.

In operation, the drill bit drills a hole, and is uniquely adapted to pass through a series of spaced objects. As each successive object is encountered, the tip is withdrawn and manually pushed or speared into the object, slightly penetrating the surface. Once started in this manner, the drill bit maintains the desired axial alignment as it is rotated through the object.

DESCRIPTION OF THE DRAWINGS

FIG. 1 is a partial perspective view of the drill bit of the present invention.

FIG. 2 is an elevational view of the drill bit shown in FIG. 1 connected to a drill and cutting at an angle through a series of spaced wall studs.

FIG. 3 is an enlarged partial top plan view of the drill bit shown in FIG. 1.

FIG. 4 is a side elevational view of the drill bit shown in FIG. 3.

FIG. 5 is an enlarged end view of the drill bit shown in FIG. 4.

FIG. 6 is an enlarged sectional view taken in the plane of line 6—6 on FIG. 4.

FIG. 7 is an enlarged sectional view taken in the plane of line 7—7 on FIG. 4.

FIG. 8 is an enlarged sectional view taken in the plane of line 8—8 on FIG. 4.

FIG. 9 is a schematic view of an electric heating unit utilized to electrically heat an end of a drill rod during the process for producing the drill bit shown in FIG. 1.

DESCRIPTION OF THE PREFERRED EMBODIMENT

Referring to the drawings, there is shown an axially self-aligning drill bit 10 embodying the present invention. This bit 10 is adapted to maintain a preset penetration angle 32 as successive spaced wall studs 30, for example, are drilled by the rotating drill bit (FIGS. 1 and 2). The drill bit includes an elongated shank 14 that is adapted to be releasably connected at one end to a chuck 29 of a power drill 28. The other end of the shank 14 is integrally formed with a cutting head 26.

The cutting head 26 includes a generally pyramid-shaped wedge-like point 13 that terminates in a linearly extending tip 12. Two enlarged opposed flat or face surfaces 22 form two of the four surfaces of the point. Each flat surface 22 is of generally triangular, diamond or parallelogram shape. The flat surfaces 22 diverge from each other as they extend rearwardly to integrally connect to the shank 14 (FIG. 4). It is only the forwardmost triangular half of the two flat face surfaces 22 that are included in the point 13. As shown in FIG. 13, the width of each face surface 22 at its widest point is greater than the diameter of the shank 14. The two face surfaces 22 are offset from each other and are generally perpendicular to a plane 23 (FIG. 5) which includes the longitudinal axis of the drill bit 10 and intersects the tip edge 12 defined by the intersection of side surfaces 20, 21. The tip 12 is further defined by an edge line angularly intersecting the plane 23, which line diagonally connects the forwardmost apexes of the two spaced flat surfaces 22.

The two other surfaces of the point 13 are a first tapered or side surface 20 and a second tapered or side surface 21. The first and second tapered surfaces 20 and 21 are planar and are ground or cut onto the point 13 at an angle 27 that intersects the plane 23 at between ten and twenty-five degrees. The two tapered surfaces 20 and 21 then diverge away from the plane 23, terminating at first and second rounded transition edges 24 and 25, respectively. The transition edges 24 and 25 converge toward the longitudinal axis of the drill bit 10 to integrally connect to the shank 14 (FIGS. 1 and 3). As seen in FIGS. 5 through 8, the tapered surfaces 20 and 21 intersect to form the tip edge 12, and increase in thickness from the tip to their termination at the transition edges 24 and 25.

A first cutting edge 16 and a second cutting edge 17 are defined by the intersection of the flat surfaces 22 and the first and second tapered surfaces 20 and 21, respectively. The first and second cutting edges are seen to be diagonally opposite each other with respect to a section transverse to the plane 23 (FIGS. 5 through 7). A first trailing edge 18 and a second trailing edge 19 separate the first and second cutting edges. As clearly shown in FIGS. 3 and 4, the length of each cutting edge 16, 17 is greater than the diameter of the shank 14.

The section transverse to the plane 23 shows that the tip edge 12 is initially an oblique line with respect to the plane 23 (FIG. 5). As the section is moved rearwardly from the tip 12, the section is of parallelogram configuration, having opposite acute angles at which the cutting edges 16 and 17 are located. Opposed obtuse angles establish the trailing edges 18 and 19 (FIG. 6). Moving rearwardly still further, the acute angles become larger in magnitude and are not as effective for cutting, but act to enlarge the hole already made (FIG. 7). At the transition edges 24 and 25, the section becomes essentially a rectangle with all angles being essentially right angles (FIG. 8).

The edges 16, 17, 18 and 19 are all of equal length, while the maximum width of the point 13 is preferably one-half of that length. The angle between the first cutting edge 16 and the second trailing edge 19 is about thirty degrees, which value is geometrically defined by these dimensions. Similarly, the angle between the second cutting edge 17 and the first trailing edge 18 is also about thirty degrees.

The cutting head 26 is extremely hard and has exceptional strength. The hardness means that the cutting head can hold the cutting edges 16 and 17 for a very long time without resharpening.

The entire drill bit 10 is formed of oil tempered sewer auger spring wire having a tensile strength of between two hundred twenty-four thousand and two hundred forty-four thousand pounds per square inch (p.s.i.). This type of spring wire is stiff, but will bend and results in the ability of the drill bit 10 to bore at a right angle to the rotational axis of the drill 28 through use of a holder (not shown).

The drill bit 10 is formed by first cutting the wire or rod to the desired length, which may range from a few inches to over six feet. The portion of the wire that is to be formed into the cutting head 26 is electrically heated by an electrical heating unit, such as a conventional spot welder 34, having two electrodes 36 and 37. One electrode 36 is straight, while the second electrode 37 is somewhat shortened such as by an S-curve at the free end thereof, in order to form a gap for receiving a length of the rod end. The top of the rod 14 is butted against electrode 36 and the end of electrode 37, as shown in FIG. 9. The overall length of the conducting path through the wire is desirably between about one inch and about one and one-half inches. Electric current of forty-five hundred to sixty-five hundred amps is passed through the length of wire between the electrodes until the section is visually seen to be cherry red. The rod 14 is then removed from the electrodes 36 and 37 and the heated end of the rod 14 is mechanically worked in a stamp or punch press to form an enlarged flattened end defining opposed surfaces 22. While still hot, the flattened end is cut to the desired shape. When the proper shape of the flat surfaces 22 and width of cutting head 26 are established, the heated end is rapidly quenched in oil or brine. The cutting edges 16 and 17 at tip 12 are then formed by grinding the surfaces 20 and 21 at the desired angle.

The drill bit 10 is used as shown in FIG. 2. The tip 12 is embedded or speared in a wall stud 30 and establishes the penetration angle 32 therewith. In a conventional manner, the drill bit 10 is rotated by the drill 28 to form a hole (not shown) through the first wall stud 30 encountered. Once the drill bit 10 enters the free space between the first wall stud and the next successive wall stud, the tip 12 is manually advanced until it contacts the second wall stud 30. The entire drill bit is then withdrawn and manually speared against the second wall stud. The tip 12 slightly penetrates the second wall stud and, assuming the operator is satisfied that the penetration angle 32 will be maintained, drilling continues. Once a hole is started on the correct angle by the manual insertion of the tip 12 into the wood, that angle 32 is maintained. With the bit embodying the present invention, this angle 32 may be extremely steep or acute, ranging from as steep as about five degrees up to ninety degrees, without deflection, walking or deviation from the desired path. The bit is sufficiently rugged and stiffly flexible that in the event it hits a nail or concrete surface, it will deflect rather than break.

It should be understood that though the invention has been described with a certain degree of particularity, variations may occur without departing from the scope of the invention as defined in the appended claims.

What is claimed is:

1. A drill bit comprising an elongated, stiffly flexible shank, a hardened, enlarged, generally elongated, flattened cutting head integrally and symmetrically formed on said shank, said cutting head having two opposed elongated diamond shaped face surfaces sloping towards each other from said shank, and a pair of side surfaces each intersecting a separate one of said face surfaces at an acute angle to define a cutting edge and the other one of said face surfaces at an obtuse angle to define a trailing edge, the angle between a cutting edge and its associated trailing edge being about thirty degrees, said side surfaces intersecting with each other on the longitudinal axis of said shank and at an acute angle of about thirty degrees to form a tip edge on said cutting head, said tip edge being skewed at an acute angle of between about ten degrees and about twenty-five degrees with respect to a plane through the longitudinal axis of said shank and perpendicular to the planes of said face surfaces, rounded transition edges converging inwardly from said side surfaces to said shank, said cutting head having a width at its widest part greater than the diameter of said shank, and each cutting edge having a length equal to twice the width of the widest part of the cutting head, whereby said drill bit is capable of drilling a hole effectively and accurately over a distance of substantial length without wandering from a straight path and may be readily withdrawn from the drilled hole without binding therein.

* * * * *